United States Patent Office 2,898,338
Patented Aug. 4, 1959

2,898,338

PHENYL, (2-PYRIDYL)PROPANE DERIVATIVES

Frank J. Villani, Cedar Grove, N.J., assignor to Schering Corporation, Bloomfield, N.J., a corporation of New Jersey No Drawing. Application June 22, 1954
Serial No. 438,636

5 Claims. (Cl. 260—290)

This invention relates to a new group of compounds and to processes for their manufacture. More particularly, this invention relates to a new group of substituted phenyl-(2-pyridyl)-propanes and their derivatives which are intermediates in the preparation of the therapeutically active propylamine type antihistamines. The compounds of this invention are of the following general formula:

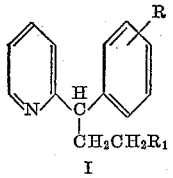

I wherein R represents hydrogen, chlorine, bromine, lower alkyl or lower alkoxy, and $R_1$ represents amino, chlorine, bromine, hydroxyl, lower alkoxy or benzyloxy.

It is well-known in the art that the propylamine type antihistamines show a high degree of therapeutic usefulness. 3-phenyl-3-(2-pyridyl) - 1 - dimethylaminopropane and 3-(p-chlorophenyl)-3-(2-pyridyl)-dimethylaminopropane, typical examples of propylamine-type substances, have found wide clinical application in the treatment of various allergic disorders.

I have now found a new series of transformations which conveniently and economically yield these active antihistaminic substances. Thus, the compounds of this invention provide a novel and useful route by which these therapeutically active substances may be produced.

The compounds of our invention may be prepared by a variety of synthetic schemes depending upon the starting material. For example, in order to prepare a compound of general Formula I wherein $R_1$ is ethoxy, the following scheme has been applied:

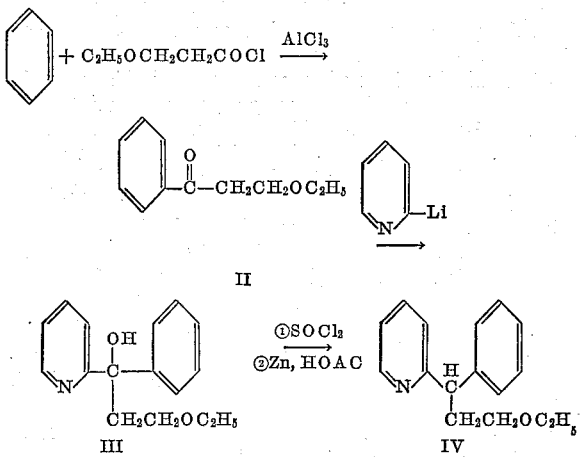

From the reaction of benzene with β-ethoxypropionyl chloride in the presence of aluminum chloride, the intermediate β-ethoxypropiophenone II is obtained. Further reaction of II with 2-pyridyllithium, according to well-described procedures, yields 1-phenyl-1-(2-pyridyl)-3-ethoxypropanol III. Replacement of the tertiary hydroxyl group in III can be effected in several ways. I prefer to treat the compound with thionyl chloride and subject the halide so formed to the reductive action of zinc in acetic acid, whereupon the ethoxy compound IV is obtained. Alternatively compound IV may be prepared by the reaction of a 2-benzylpyridine with bromoethyl ether in the presence of a basic catalyst as shown below:

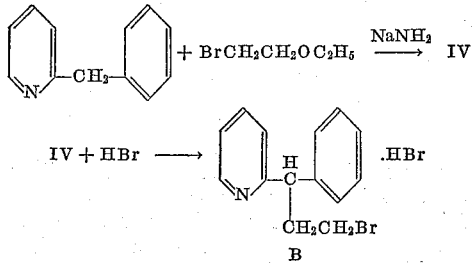

Compound IV is easily cleaved with hydrobromic acid in acetic acid to give the compound of general Formula I, wherein $R_1$ is bromine (V). Compound V may also be prepared from a 2-benzylpyridine, by reaction with ethylene oxide and an ethyl magnesium halide, whereupon the intermediate propanol (VI) is produced. Treatment of VI with a halogenating agent in a known manner affords compound V. This series of conversions is illustrated below:

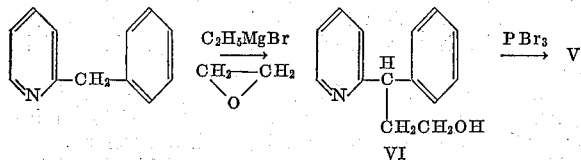

Converting compound V to an active antihistaminic substance is easily effected by treating the halide with a suitable amine, such as dimethylamine, whereupon 3-phenyl-3-(2-pyridyl) - 1 - dimethylaminopropane is obtained. Alternatively, the halide V can be caused to react with ammonia and the primary amine so obtained may be alkylated as desired in a variety of ways. For example, treating 1-bromo-3-(2-pyridyl) - 3 - (p-chlorophenyl)propane with liquid ammonia yields (usually under pressure), after removal of the solvent, compound VII, which is one of the group of compounds of my invention. Alkylation of VII with formic acid and formaldehyde yields the active antihistaminic substance VIII:

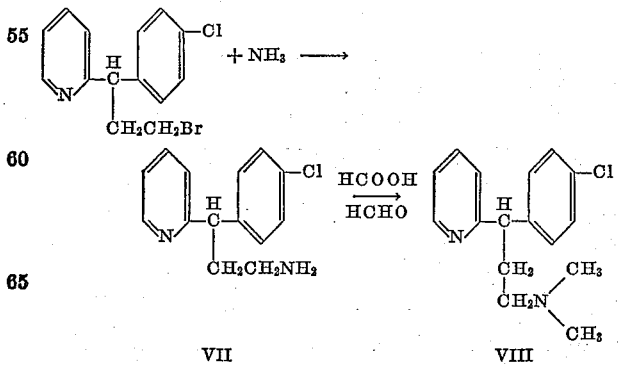

Compounds of general Formula I wherein $R_1$ is amino may alternatively be prepared according to the following equations:

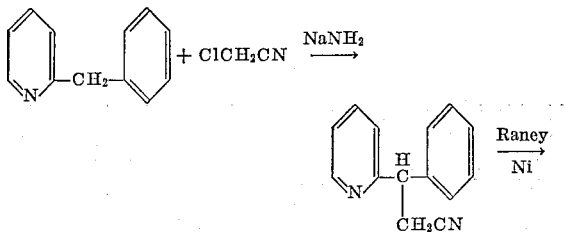

Treating a 2-benzylpyridine with chloroacetonitrile yields the intermediate phenyl-2-pyridylpropionitrile which, upon reduction, affords the amino compound of general Formula I.

I have also prepared the amino compound from the intermediate β-phenyl-β-(2-pyridyl)propionaldehyde by reductive alkylation as shown below:

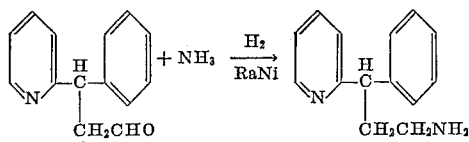

The compounds of the invention are easily transformed into active therapeutic agents by procedures described in the literature for analogous substances. The members of the group comprising $R_1$ are easily interconvertible without undue difficulty. For example, the alkoxy compounds are easily cleaved to yield the free hydroxyl compound or the halogen-containing substance, dependent upon the conditions of the reaction. The halogenated compounds may be transformed into the amino compounds by reaction with ammonia as described above. Methylation of the amino compound in any of several ways known to those skilled in the art, such as the use of formic acid and formaldehyde, dimethylsulfate, etc., affords the corresponding dimethylaminopropane, such as 3-phenyl-3-(2-pyridyl)-dimethylaminopropane, which has found wide utility as an antihistaminic agent.

Furthermore, the hydroxy or alkoxy compounds of general Formula I may be dehydrated to yield an intermediate vinyl compound (IX) which, upon reaction with ammonia or an alkylated amine, yields the amino compound of Formula I or the active substance itself as shown below:

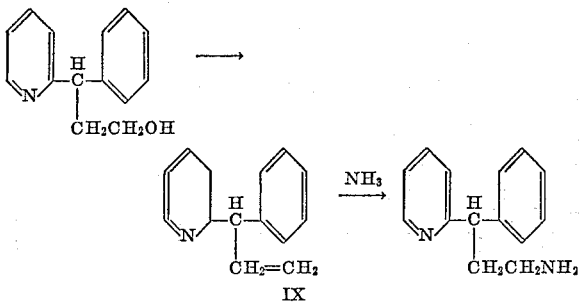

The following specific examples are illustrative of the principles of the invention:

EXAMPLE 1

*3-(p-chlorophenyl)-3-(2-pyridyl)-1-ethoxypropane*

To a solution of 0.75 m. of potassium amide in 1,500 ml. of liquid ammonia, there is added dropwise 0.75 m. of p-chloro-2-benzylpyridine. After stirring the mixture for about 10 minutes there is added 0.75 mole of β-bromoethyl ether and the liquid ammonia is allowed to evaporate. The residue is treated with water and the mixture extracted with ether. The ether solution is dried over anhydrous sodium sulfate, concentrated in vacuo and the residue distilled to yield the ethyl ether of this example, B.P. 148–151° C./0.5–1 mm.

EXAMPLE 2

*3-(p-chlorophenyl)-3-(2-pyridyl)-1-bromopropane hydrobromide*

A solution of 0.1 mole of the compound of Example 1 in 350 ml. of 48% hydrobromic acid is refluxed for 24 hours. Upon concentration of the solution in vacuo there is obtained the hygroscopic hydrobromide.

EXAMPLE 3

*3-(p-methoxyphenyl)-3-(2-pyridyl)-propylamine*

The intermediate β-(p-methoxyphenyl)-β-(2-pyridyl)-propionitrile is prepared by the alkylation of p-methoxy-2-benzylpyridine with chloroacetonitrile in the presence of potassium amide and liquid ammonia according to the procedure of Example 1, B.P. 175–178° C./1 mm.

A solution of 0.1 mole of the propionitrile obtained above, in 150 ml. of ethanol is saturated with anhydrous ammonia and subjected to hydrogenation at 60° under three atmospheres of hydrogen in the presence of Raney nickel catalyst. After removal of the catalyst by filtration, the solvent is distilled in vacuo and the residue fractionated to yield the amine of this example, B.P. 160–164° C./1 mm.

EXAMPLE 4

*3-(p-methylphenyl)-3-(2-pyridyl)propylamine*

The intermediate β-p-methylphenyl-β-(2-pyridyl)propionitrile is prepared from p-methyl-2-benzylpyridine and chloroacetonitrile according to the procedure of Example 1, B.P. 168–172° C./175 mm.

Hydrogenation of the nitrile obtained above with Raney nickel catalyst according to the procedure of Example 3, there is obtained the substituted propylamine of this example, B.P. 148–150° C./1 mm.

EXAMPLE 5

*3-phenyl-3-(2-pyridyl)propylamine*

To a solution of 0.1 mole of potassium amide in 500 ml. of liquid ammonia there is added dropwise 0.1 mole of 2-benzylpyridine. After stirring for 10 minutes there is then added 0.1 mole of chloroacetaldehyde diethylacetal and the ammonia solvent is allowed to evaporate. The residual mixture is treated with 160 g. of 30% sulfuric acid in an atmosphere of carbon dioxide for 15 minutes. The mixture is then extracted with ether and the ether solvent is dried with anhydrous sodium sulfate. Upon removal of the ether in vacuo there is obtained the crude intermediate aldehyde which is dissolved in 200 ml. of absolute ethanol. The alcoholic solution of the aldehyde is then saturated with anhydrous ammonia gas and hydrogenated at room temperature under 60 lbs. pressure of hydrogen in the presence of Raney nickel to yield the primary amine of this example, B.P. 130–135° C./2 mm.

Alternatively, the amino compound of this example may be prepared in the following manner. A mixture of 30 g. of 3-phenyl-3-(2-pyridyl) propanol (see Example 8) and 150 g. of 8% sulfuric acid is heated on a steam bath for 6 hours. After cooling, the mixture is poured on to ice and is neutralized by the careful addition of solid sodium carbonate. The mixture is then extracted with benzene and, after removal of the benzene solvent, the residue is distilled to yield the intermediate 3-phenyl-3-(2-pyridyl)propylene, B.P. 137–140° C./2.5 mm.

Twenty grams of the propylene compound in 100 grams of anhydrous liquid ammonia are heated in a steel autoclave for 15 hours at a temperature of 150° C. After cooling the autoclave is opened and the ammonia allowed to evaporate. Distillation of the residue yields the primary amine of this example.

EXAMPLE 6

3-p-bromophenyl-3-(2-pyridyl)propylamine

The intermediate β-p-bromophenyl-β-(2-pyridyl)propionitrile is prepared from p-bromobenzylpyridine and chloroacetonitrile according to the procedure of Example 1. A solution of 0.1 mole of the intermediate nitrile in anhydrous ether is dropwise added to an ether solution of 0.1 mole of lithium aluminum hydride. The reaction mixture is refluxed for 6 hours, decomposed with water, filtered, and the filtrate concentrated in vacuo, whereupon the residue is distilled to yield the primary amine of this example, B.P. 160–163° C./1 mm.

EXAMPLE 7

3-p-chlorophenyl-3-(2-pyridyl)propanol

A mixture of 102 g. of p-chloro-2-benzylpyridine and 55 g. of ethyl bromide in a solution of 150 ml. of anhydrous ether and 150 ml. of anhydrous benzene is added to a stirred suspension of 24 g. of magnesium turnings and 200 ml. of anhydrous ether. The mixture is refluxed for 5 hours whereupon it is cooled to 0–5° and 44 g. of ethylene oxide is bubbled in while maintaining the low temperature. After allowing the reaction mixture to stand overnight at room temperature, the reaction complex is decomposed with dilute ammonium chloride solution and the organic layer is separated and distilled. The above-entitled propanol is obtained as a pale yellow oil, B.P. 184–190° C./3 mm.

EXAMPLE 8

3-phenyl-3-(2-pyridyl)propanol

From the reaction of 2-benzylpyridine and ethylene oxide, according to the procedure described in Example 7, there is obtained 3-phenyl-3-(2-pyridyl)-propanol, B.P. 164–169° C./1 mm.

EXAMPLE 9

3-phenyl-3-(2-pyridyl)-1-bromopropane

A solution of 1.0 mole of the alcohol obtained in Example 8 in anhydrous benzene containing 1.0 mole of pyridine is cooled in an ice bath while a slight excess of phosphorus tribromide dissolved in anhydrous benzene is slowly added. The resultant mixture is held at 5–10° C. for three hours, whereupon the solvents are removed in vacuo and the residue is treated with sodium bicarbonate solution and extracted with benzene. The benzene is removed in vacuo yielding the bromo compound of this example, which is of sufficient purity for further transformation.

The bromide in this example is transformed into the amine of Example 5 in the following manner. By dissolving the bromide in anhydrous dioxane and subjecting the solution to the action of excess anhydrous ammonia in a steel autoclave at 100° C. for 8 hours followed by removal of the solvents in vacuo and distillation of the residue, there is obtained the amine of Example 5.

EXAMPLE 10

3-phenyl-3-(2-pyridyl)-1-benzyloxypropane

From the reaction of 0.1 mole of 2-benzylpyridine and 0.1 mole of β-bromoethylbenzyloxy ether in liquid ammonia in the presence of potassium amide, according to the procedure of Example 1, the benzyl ether of this example is obtained, B.P. 157–160° C./0.5 mm.

I claim:

1. 3-(p-chlorophenyl)-3-(2-pyridyl)-1-bromopropane hydrobromide.
2. 3-phenyl-3-(2-pyridyl)-1-bromopropane.
3. The compound, 2-(1-p-chlorophenylpropan-3-ol) pyridine whose structural formula is:

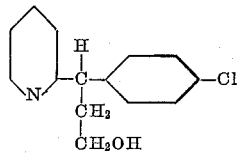

4. The compound, 2-(1-phenylpropane-3-ol)pyridine whose structural formula is:

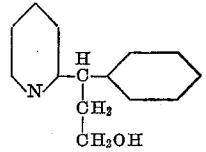

5. Compounds of the general formula

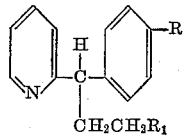

wherein R is a member of the group consisting of hydrogen, chlorine, bromine, lower alkyl and lower alkoxy and $R_1$ is a member of the group consisting of chlorine, bromine and hydroxyl.

References Cited in the file of this patent

UNITED STATES PATENTS

| | | |
|---|---|---|
| 2,656,358 | Sperber | Oct. 20, 1953 |
| 2,667,491 | Sutherland | Jan. 26, 1954 |
| 2,676,964 | Sperber | Apr. 27, 1954 |
| 2,694,706 | Cusic | Nov. 16, 1954 |